US006895248B1

(12) United States Patent
Akyol et al.

(10) Patent No.: US 6,895,248 B1
(45) Date of Patent: May 17, 2005

(54) DYNAMIC RESOURCE ALLOCATION AND MEDIA ACCESS CONTROL FOR A WIRELESS ATM NETWORK

(75) Inventors: Bora A. Akyol, Los Gatos, CA (US); Donald C. Cox, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 09/324,367

(22) Filed: Jun. 2, 1999

Related U.S. Application Data (60) Provisional application No. 60/087,608, filed on Jun. 2, 1998.

(51) Int. Cl.[7] ................................................. H04Q 7/20
(52) U.S. Cl. ................. 455/452.1; 455/453; 370/310.2; 370/330; 370/338; 370/905
(58) Field of Search ............................... 370/310.2, 319, 370/321, 329, 330, 338, 343, 345, 347, 395, 404, 432, 433, 441, 442, 445, 458, 459, 901, 905, 908, 913; 455/450–453

(56) References Cited

U.S. PATENT DOCUMENTS

| | | | | |
|---|---|---|---|---|
| 5,535,207 A | * | 7/1996 | Dupont | 370/433 |
| 5,742,592 A | * | 4/1998 | Scholefield et al. | 370/329 |
| 5,818,829 A | * | 10/1998 | Raith et al. | 370/347 |
| 5,970,062 A | * | 10/1999 | Bauchot | 370/310.2 |
| 6,052,594 A | * | 4/2000 | Chuang et al. | 455/450 |
| 6,094,425 A | * | 7/2000 | Auger et al. | 370/330 |
| 6,295,285 B1 | * | 9/2001 | Whitehead | 370/329 |
| 6,317,435 B1 | * | 11/2001 | Tiedemann, et al. | 370/441 |
| 6,381,461 B1 | * | 4/2002 | Besson et al. | 455/450 |

* cited by examiner

*Primary Examiner*—Nay Maung
*Assistant Examiner*—Edan Orgad
(74) *Attorney, Agent, or Firm*—Lumen Intellectual Property Services, Inc.

(57) ABSTRACT

A resource allocation method for use in a wireless ATM network comprises receiving on a wireless signaling channel a request for access to a shared frequency-time sliced wireless medium. A channel matrix is then searched for a set of available frequency-time slots. The channel matrix represents a time frame within the shared frequency-time sliced wireless medium, and is used to keep track of resource allocation in the time-frequency sliced medium. The set of available time-slots is then allocated if the allocation does not violate a frequency switching constraint, and if the set of available frequency-time slots contains a number of slots no smaller than a requested number of slots. In a preferred embodiment of the invention, the searching step uses a greedy resource allocation strategy to search a channel-chunk matrix comprising a list of contiguous chunks of available time slots in each frequency of the shared frequency-time sliced wireless medium. The greedy resource allocation strategy comprises the following successive allocation steps: searching for a single contiguous set of available time slots in a single frequency, where the size of the set of available slots is equal to the requested size [60]; searching for a single contiguous set of available time slots in a single frequency, where the size of the set of available slots is greater than the requested size [64]; searching for separate chunks of available time slots in a single frequency [66]; and searching for separate chunks of available time slots in multiple frequencies [68]. Each allocation step comprises checking whether the allocation violates a frequency switching constraint.

16 Claims, 8 Drawing Sheets

DYNAMIC RESOURCE ALLOCATION AND MEDIA ACCESS CONTROL FOR A WIRELESS ATM NETWORK

CROSS-REFERENCE TO RELATED APPLICATIONS

This application claims priority from U.S. Provisional Patent Application 60/087,608 filed Jun. 2, 1998, which is incorporated herein by reference.

FIELD OF THE INVENTION

The present invention relates to techniques for media access control and resource allocation within wireless digital communications networks. More specifically, it relates to methods for dynamic media access and resource allocation in a multi-tier wireless ATM network supporting multiple users, multiple connections per user, and multiple traffic types with different service priorities.

BACKGROUND OF THE INVENTION

Asynchronous transfer mode (ATM) is a digital network transport technology originally developed to accommodate multiple traffic types on high-speed wireline networks. Although ATM is only in limited use today, it is commonly assumed that the future wireline backbone networks will employ ATM transport. Because ATM provides various advantages, such as quality-of-service (QoS) guarantees, researchers have proposed to eventually adapt ATM to the wireless medium as well. Wireless ATM (WATM) would in principle offer significant advantages over existing wireless local area networking (WLAN) standards. Extending wireline ATM techniques to the wireless medium, however, is far from trivial. The difficulties in developing WATM are due primarily to the fact that ATM was originally designed for a wireline medium, in which one can assume fixed users, plentiful and reliable bandwidth, and high transmission quality. In a wireless medium, however, user connections may change as they move in and out of the service area, the bandwidth is limited and variable, and the transmission quality can be low. Because conventional wireline ATM does not provide techniques for handling these properties of wireless media, WATM requires new solutions to various fundamental networking problems.

One of the important problems to be solved in developing WATM technology is finding an efficient media access control (MAC) technique suitable for the wireless medium. In order to maintain full compatibility with existing wireline ATM networks, a wireless ATM network MAC protocol must support multiple users, multiple connections per user, and service priorities with quality of service requirements. In addition to these basic requirements, such a MAC protocol should efficiently use the limited wireless bandwidth. Known MAC protocols for wireless ATM, however, do not support the use of multiple frequency bands, and do not, therefore, make maximal use of the valuable wireless bandwidth. There is a need, therefore, for a media access control and resource allocation technique that overcomes these and other disadvantages of known MAC protocols designed for wireless ATM networks.

SUMMARY OF THE INVENTION

The present invention overcomes the disadvantages of known MAC protocols for wireless ATM. The technique of the invention, hereinafter termed dynamic resource allocating media access (DRAMA), is a reservation-based media access control and resource allocation method for a wireless ATM network. DRAMA is unique in its support for multiple frequency bands and frequency-time sliced resource allocation. DRAMA is the first MAC technique that supports a multi-tier wireless ATM network, i.e., an ATM network that is able to provide its users with varying data rates depending on the user's geographic region, e.g., local area indoor environment, campus environment, or wide area network environment. Campus and local area environments typically can provide high data rates using frequencies above 2 GHz. At these frequencies, however, walls, partitions, and other objects limit the range of transmissions to campus-scale distances. While transmissions in the 800–900 MHz band have longer range, spectrum in this band is very scarce, and data rates must be lower. Consequently, in order to take full advantage of the entire available spectrum and provide service over various geographical regions, a flexible wireless network must accommodate multiple tiers and multiple frequency bands. Accordingly, DRAMA is a media access and resource allocation technique specifically designed for multi-tier wireless ATM networks.

In one aspect of the invention, a method is provided for frequency-time sliced resource allocation in a wireless ATM network. The method comprises receiving on a wireless signaling channel a request for access to a shared frequency-time sliced wireless medium. A channel matrix is then searched for a set of available frequency-time slots. The channel matrix represents a time frame within the shared frequency-time sliced wireless medium, and is used to keep track of resource allocation in the time-frequency sliced medium. The set of available time-slots is then allocated if the allocation does not violate a frequency switching constraint, and if the set of available frequency-time slots contains a number of slots no smaller than a requested number of slots.

In a preferred embodiment of the invention, the searching step uses a greedy resource allocation strategy to search a channel-chunk matrix comprising a list of contiguous chunks of available time slots in each frequency of the shared frequency-time sliced wireless medium. The greedy resource allocation strategy comprises the following successive allocation steps: a) searching for a single contiguous set of available time slots in a single frequency, where the size of the set of available slots is equal to the requested size; b) searching for a single contiguous set of available time slots in a single frequency, where the size of the set of available slots is greater than the requested size; c) searching for separate chunks of available time slots in a single frequency; and d) searching for separate chunks of available time slots in multiple frequencies. Each allocation step comprises checking whether the allocation violates a frequency switching constraint.

This resource allocation method enjoys many advantages which will become apparent from the following description and accompanying drawings.

DESCRIPTION OF THE PREFERRED EMBODIMENT

The following description of a preferred embodiment of the present invention contains many details for the purposes of illustration. Those skilled in the art of the present invention will appreciate that many of these details can be altered without departing from the essential ideas of the invention. Accordingly, the scope of the invention should not be understood to be limited by the specifics in this detailed description.

Media access control is required to arbitrate access to the radio spectrum of a wireless ATM network. Resource allocation is the process of allocating network resources to wireless users. This detailed description presents a preferred embodiment of a media access control and resource allocation method referred to as dynamic resource allocating multiple access (DRAMA) for wireless ATM networks.

The Wireless ATM Network Environment

DRAMA is a dynamic resource allocation and media access control technique for a multi-tier wireless ATM network. A multi-tier wireless ATM network is a network that may provide its users with varying data rates depending on geographic location. For example, data rates in an indoor environment may be close to Ethernet speeds at 10–20 Mbits/sec. In a campus environment, it may be feasible to provide a data rate of 2–8 Mbits/sec. In a wide area network, the user may still gain access to the benefits of the wireless ATM network but at a lower rate of 256–512 kbits/sec. These three environments are referred to as local area, campus area, and wide area environments, respectively. The need for a multi-tier network arises because of the scarcity of radio spectrum and power available for radio transmission in a portable unit. The higher data rates for the campus and local area environments are likely to be provided in the 2 GHz and higher frequency bands. At those frequencies, the range of radio transmission is limited by walls, partitions, etc. Due to this fact and to the scarcity of radio spectrum in the 800–900 MHz frequencies, a multi-tier network is needed. DRAMA is designed with multi-tier wireless ATM networking in mind and is able to accommodate multiple types of ATM traffic and to provide quality of service guarantees in resource allocation. It also benefits from statistical multiplexing and allows data users full access to the channel bandwidth on a burst basis when full channel resources are available.

Figure 1:
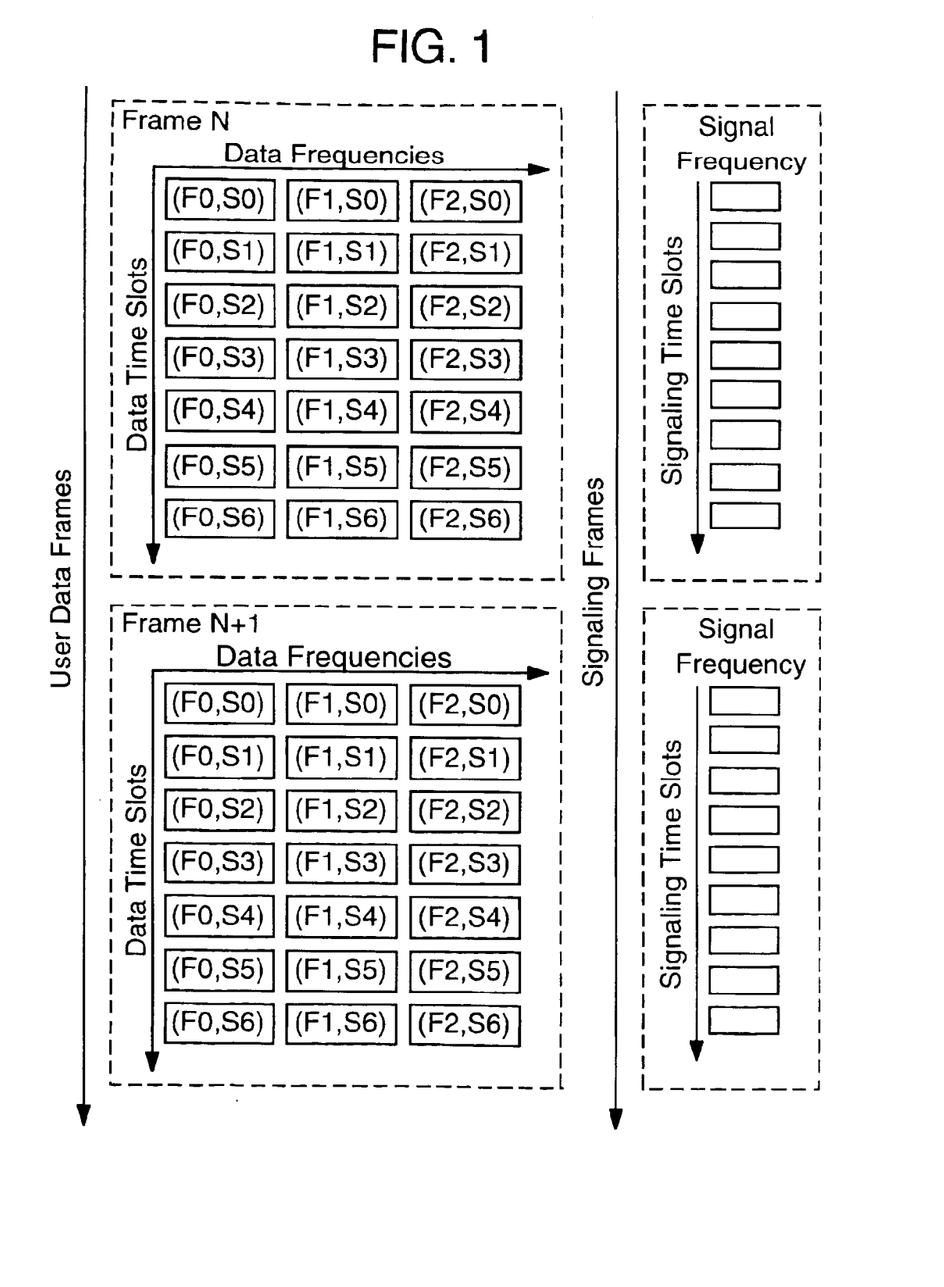
FIG. 1 illustrates a time-slotted and frequency-multiplexed radio environment in which the present invention is designed to operate.

DRAMA is designed to function in a time-slotted and frequency multiplexed radio environment, as illustrated in FIG. 1. In such an environment, each frequency channel (e.g., F0, . . . , F2) is divided temporally into sequential frames (e.g., frame N and frame N+1) which are further divided into time slots (e.g., slots S0, . . . , S6). Users can access multiple time slots in a single frequency or multiple time slots spanning multiple frequencies. Each frame of the time-slotted and frequency multiplexed radio channel is represented by an M-by-N channel matrix, where M is the number of slots in each frequency and N is the number of total frequencies assigned to each radio port of the system. In the example shown in FIG. 1, the channel matrix is a 7-by-3 matrix of 21 separate frequency-time slots. In the DRAMA environment, the downlink frequencies are only accessed by the radio ports and the access is strictly controlled by radio port controllers. There is no contention on the downlink radio channels; hence, we limit our discussion here to the uplink frequencies and resolve only the contention that is caused by the user requests on the uplink channels. Also shown in FIG. 1 are frames and slots of the signal frequency, which will be discussed in more detail later.

Figure 2:
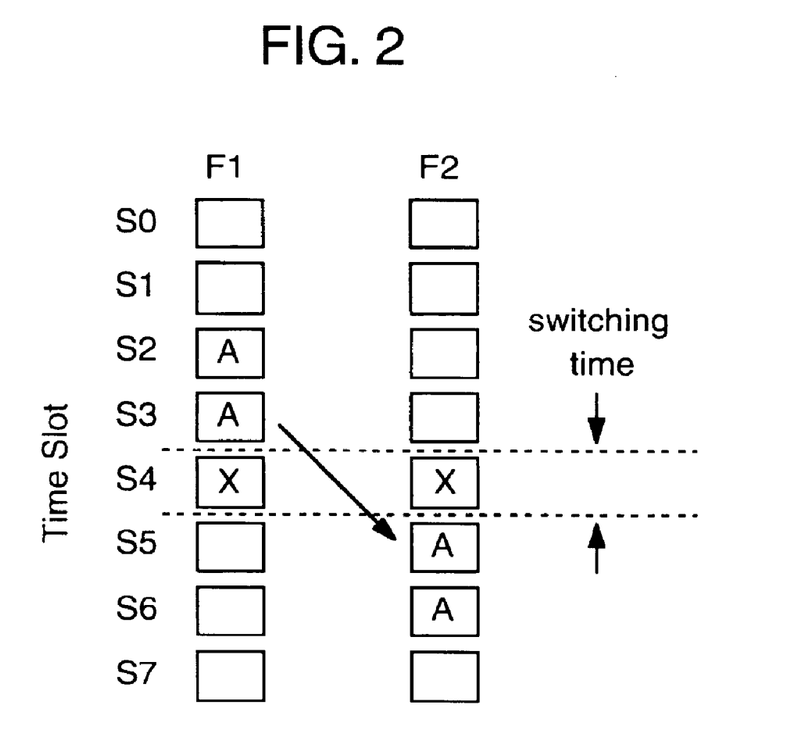
FIG. 2 illustrates the frequency-switching problem, wherein a radio transceiver requires a non-zero switching time to switch from one frequency (F1) to another frequency (F2) during transmission or reception of data in a frequency-time sliced environment.

A resource allocation that uses multiple time slots spanning multiple frequencies is defined as a frequency time-sliced allocation. The optimal resource allocation policy for accommodating different traffic types in a time-slotted, frequency-duplexed environment is known in principle to be frequency-time sliced allocation. A practical problem associated with frequency-time sliced resource allocation, however, is the frequency switching time required by most of today's radio transceivers. As illustrated in FIG. 2, a radio transceiver requires a non-zero switching time to switch from one frequency (F1) to another frequency (F2) during transmission or reception of a data burst (A) if a frequency-time sliced resource allocation technique is used. This switching time creates blind spots (X at slot S4) in the channel matrix. This problem imposes a frequency switching constraint on the resource allocation algorithm that complicates its efficient implementation. It is possible to formulate an optimal allocation problem that allocates requests in a frequency-time sliced manner for multiple requests by performing an optimization that includes both existing and queued requests and also considers the frequency switching time limitations described above. However, due to the nature of the radio traffic, which has relatively short connection durations and relatively high mobility, it is not feasible in most cases to solve this optimization problem on the order of tens of milliseconds. Because most networks require that the radio port controller be able to perform this allocation in less than a few milliseconds, the optimal allocation technique is not useful in practice. This problem is further complicated by the fact that the allocation may possibly involve hundreds of users, hundreds of time slots, and tens of frequencies. The technique provided by DRAMA solves this problem using a heuristic greedy resource allocation algorithm that successfully performs resource allocation in an environment with frequency switching constraints.

As mentioned above, DRAMA is designed to support multiple traffic types with different service quality and bandwidth requirements. The existence of different traffic types with different service criteria requires the resource allocation algorithm to set priorities. For the purpose of performance estimation, CBR traffic has priority over data traffic. Note that DRAMA is capable of working with different priority policies including time of expiry, or quality of service based priority schemes. For requests within the same priority class, we employ a first-come-first-served (FCFS) priority scheme for allocating resources to requests.

Dynamic Resource Allocating Multiple Access Algorithm

Gaining access to a network resource can be divided into two tasks: requesting the resource from the resource broker and allocation of the resource by the broker. In a system implementing the present techniques, the wireless users are connected to the wireless ATM network via radio ports. The radio ports are controlled by radio port controllers. Each radio port controller may control more than one radio port. The radio ports are designed to be small and economical radio modems that are easy to deploy. The intelligence of the radio network is in the implementation of the radio port controller and the switching hardware. In this section we present the DRAMA algorithm in two parts: media access control (MAC) and resource allocation (RA).

Media Access Control

Media access control is defined as the procedure for controlling how users gain access to a particular shared media for the purpose of information transmission. For example, the IEEE 802.3 standard is a media access control protocol for local area networks based on a shared media bus topology (Ethernet). The radio channel is the shared media in the wireless ATM network. Gaining access to the shared radio channel is a two step process when the DRAMA algorithm is employed. The first step is to send an access request to the radio port controller. The access request is sent in the designated signaling and control channel(s), as shown in FIG. 1. These signaling channels may be shared by all three tiers of the wireless ATM network. Our analysis of the DRAMA algorithm is based on a time-slotted transmission format for the signaling channels. The signaling channels are accessed using a slotted-ALOHA algorithm. The slot format of the signaling channel is different from the user channels which are considerably wider in bandwidth. Existence of a single signaling channel for access to multiple frequencies and multiple tiers of the network allows the network to benefit from statistical multiplexing on the signaling channel in contrast to having a smaller number of signaling slots in each user frequency. With the advent of "soft" radio technologies, the added cost of receiving a considerably narrower signaling channel together with the wideband user information channels is minimal.

Figure 3:
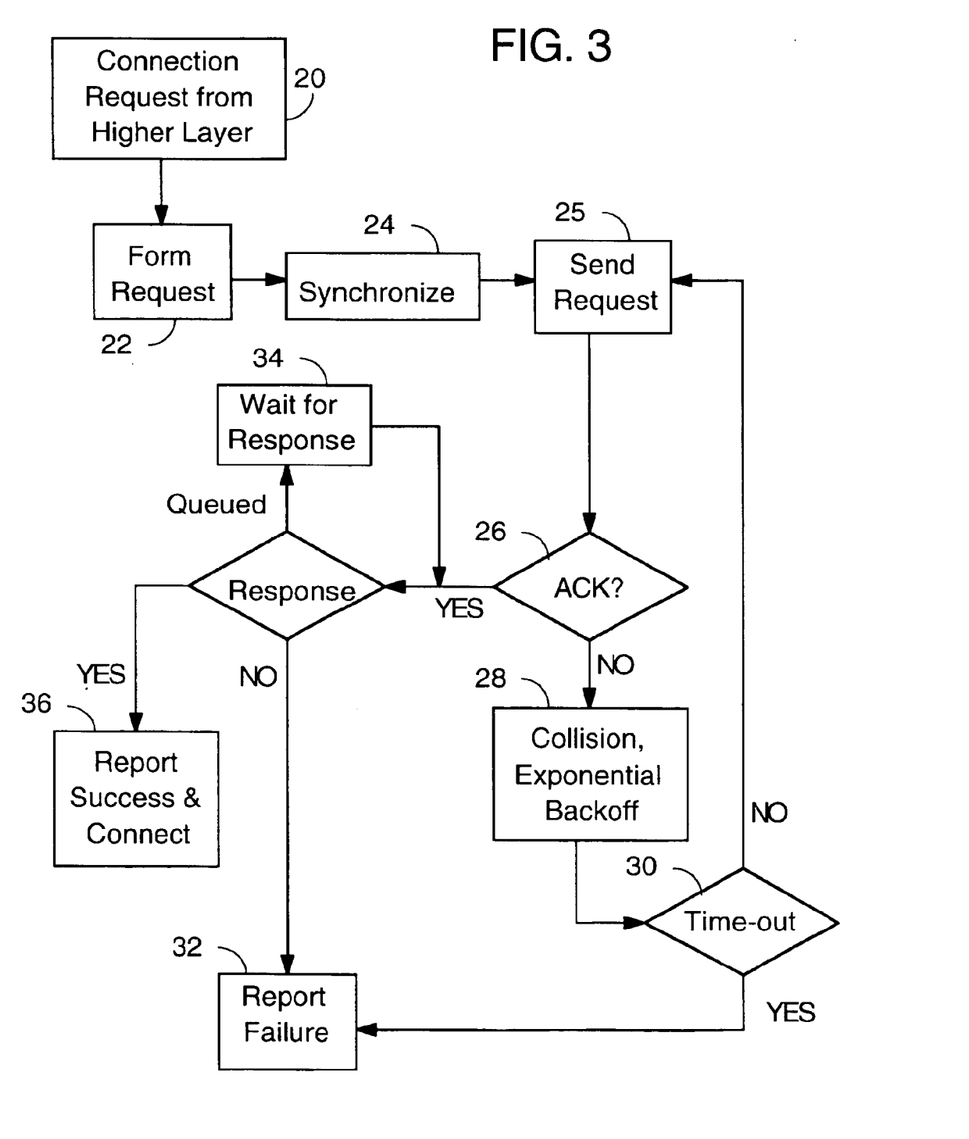
FIG. 3 is a flow chart of a media access procedure according to a preferred embodiment of the present invention.

FIG. 3 is a flow chart of media access in the DRAMA algorithm. When a user terminal needs to send information through the wireless network, a higher level connection request 20 is received by the algorithm, which then forms a short request 22 detailing the type of service requested, synchronizes 24 with the next available slot in the signaling channel, and sends 25 the request. The user terminal checks for an acknowledgement 26 of the request from the radio port controller. If no acknowledgement is received (e.g., because more than one user terminal accessed the same signaling slot to send a request), a collision occurs 28. The request is then checked to see if it has timed out 30. If it has not timed out, it is sent again 25 and the user checks again for acknowledgement 26. The user terminal employs an exponential backoff procedure 28 for retrying the request. If the request times out after a maximum allotted time for media access, the procedure may report a failure 32 to the upper layer protocols or try a different radio port. If the request is received by the radio port controller, the user receives acknowledgement and waits for a response 34 from the resource allocation. If there is no response, a failure is reported 32. If the radio port responds, success is reported to the upper layers and a connection is established 36.

In a multi-tier environment it is beneficial to use the same control signaling formats for all of the tiers in the network for seamless connectivity while crossing network tier boundaries (e.g., from local area to campus area, or from campus area to wide area). Accordingly, all tiers in the wireless ATM network use the same control messages. Due to the different traffic parameters in different network tiers, however, signaling channel bandwidths may be different among the tiers.

Resource Allocation in DRAMA

Figure 4:
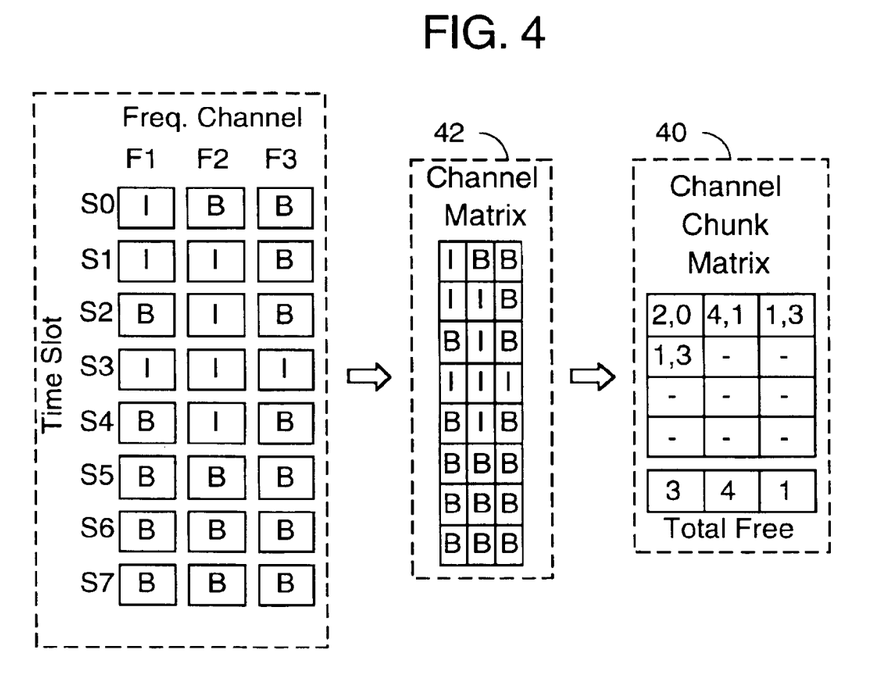
FIG. 4 illustrates an example of a channel chunk matrix (CCM) which is used while performing resource allocation according to the methods of the present invention.

Before discussing the details of the resource allocation part of the DRAMA algorithm, first it is necessary to introduce a channel chunk matrix (CCM) which is used while performing resource allocation. The CCM is a matrix created by the port controller for indexing and referencing available wireless ATM network resources. As illustrated in FIG. 4, the CCM 40 is formed from the channel matrix 42 by grouping and counting the empty time slots in each frequency (represented by a column of the channel matrix) and sorting them in the order of magnitude. In the example shown in FIG. 4, the channel matrix is an 8-by-3 matrix representing three frequency channels of eight time slots each, i.e., a collection of 24 frequency-time slots. The frequency-time slots that have been allocated are marked in the figure with a "B" to indicate that they are busy, while the remaining slots are marked with an "I" to indicate that they are idle. In each frequency column of the channel matrix, the idle slots are grouped into contiguous chunks whose slot position and size are recorded in the corresponding column of the CCM. Each entry of the CCM thus contains a pair of integers: the number of idle slots in the chunk and the temporal position of the chunk within the frame. For example, suppose a frequency channel F1 having eight slots $S0, \ldots, S1$ has its slots filled according to the pattern (I, I, B, I, B, B, B, B), as shown in FIG. 4. The corresponding column of the CCM is then ((2,0), (1, 3)), where (2,0) denotes that there are 2 consecutive idle slots starting at slot S0. As also shown in FIG. 4, the total number of idle slots is 3, and this number is also recorded together with the CCM. By using the CCM, the radio port controller can allocate the available resources rapidly.

Figure 5:
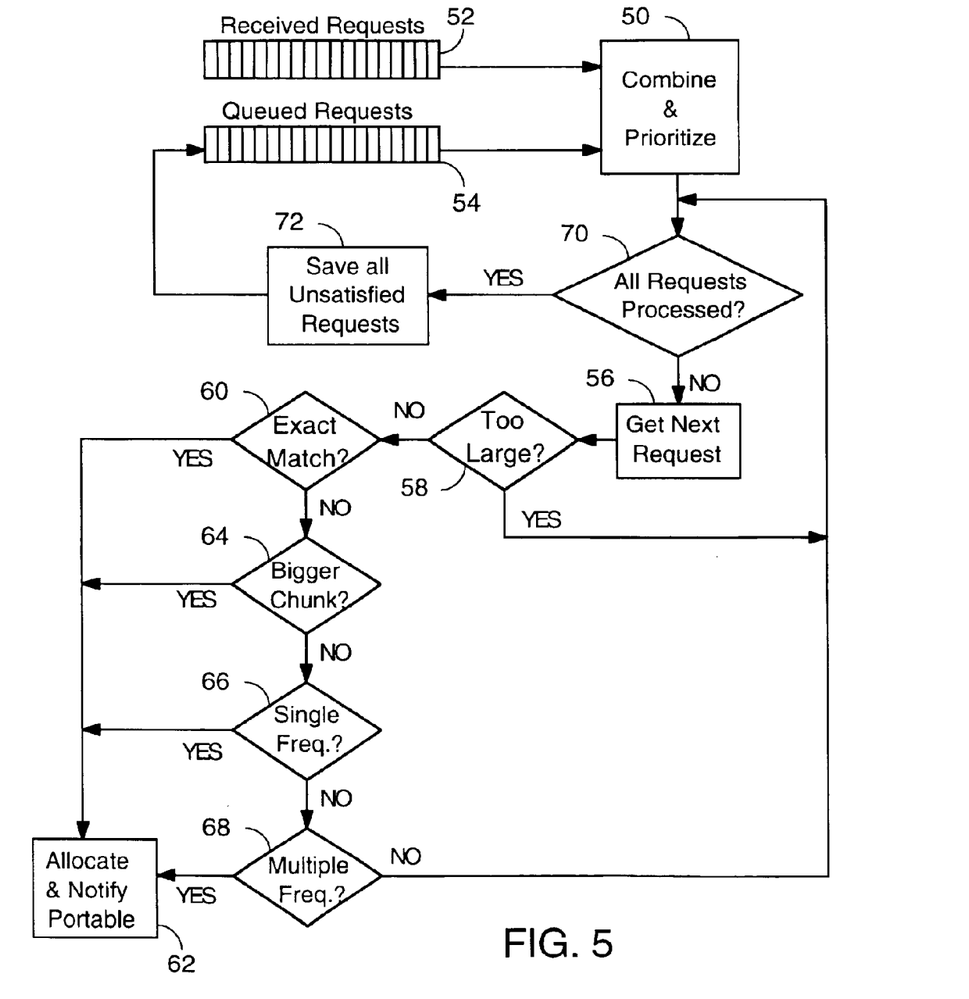
FIG. 5 is a flow chart of a resource allocation procedure according to a preferred embodiment of the present invention.

The resource allocation procedure in DRAMA will now be described in detail with reference to FIGS. 5–8. A flow diagram of the procedure performed by the port controller is shown in FIG. 5. The first step is to sort and combine 50 received requests and queued requests. Received requests 52 arrive from the portables over the signaling channel. The radio port controller scans the received slots at the end of each signaling frame. All successfully decoded requests in a frame are combined with requests that were saved from previous frames in a request queue 54. The combined requests are sorted with respect to priority class and order of arrival. Requests that were queued from previous frames get higher priority in the same priority class. The sorted requests are then ready for further processing.

Resource allocation is performed on a request-by-request basis. The first step 56, therefore, is to get the next request. The request size is then checked at step 58 to determine if the requested size is larger than the total number of available slots. If so, the request is not granted at this time and control returns to process another request. If not, the port controller moves on to the first allocation step 60. In the following description of allocation steps, a frequency-time slot or chunk of slots is said to be "feasible" if its assignment to a requesting user does not result in a violation of frequency switching constraints. In the first allocation step 60, the CCM is checked to see whether there is a single feasible chunk whose size equals the request size. If so, the chunk is allocated to the requesting user and the user is notified 62. If no exact match is found in step 60, the procedure moves on the next allocation step 64, which checks the CCM for a feasible chunk whose size is larger than the request size. If such a chunk is found, it is allocated at 62. If not, the next allocation step 66 checks the CCM for a single frequency that has multiple feasible chunks whose cumulative size is equal to or greater than the request size. If there is such a frequency, the chunks are allocated at 62. If not, the last allocation step 68 attempts to perform a multiple frequency assignment by allocating feasible chunks from multiple frequencies. If this step succeeds, the chunks are allocated at 62. Otherwise, the allocation of the current request fails and control returns to check for additional requests for processing at step 70. If there are additional requests, then the port controller gets the next request and repeats the above allocation procedure. If all the requests have been processed, then the unsatisfied requests are saved at step 72. At the end of the allocation process, all portables with pending requests are notified of success or failure. We note here that failed requests may be queued for later allocation until the request expires. The expiration time of a request is defined by the traffic type and the user application(s).

This procedure will find a feasible allocation with the least amount of frequency switching. Since there are only M slots in a frequency, no portable can ask for more than M slots in a time frame. If a user has a large packet to transmit, however, the user sends in only one resource allocation request. If the request cannot be accommodated in one user data frame, it is divided in time and transmitted in subsequent frame(s). This increases the throughput of the system and avoids unnecessary retransmissions on the signaling channel.

Figure 6:
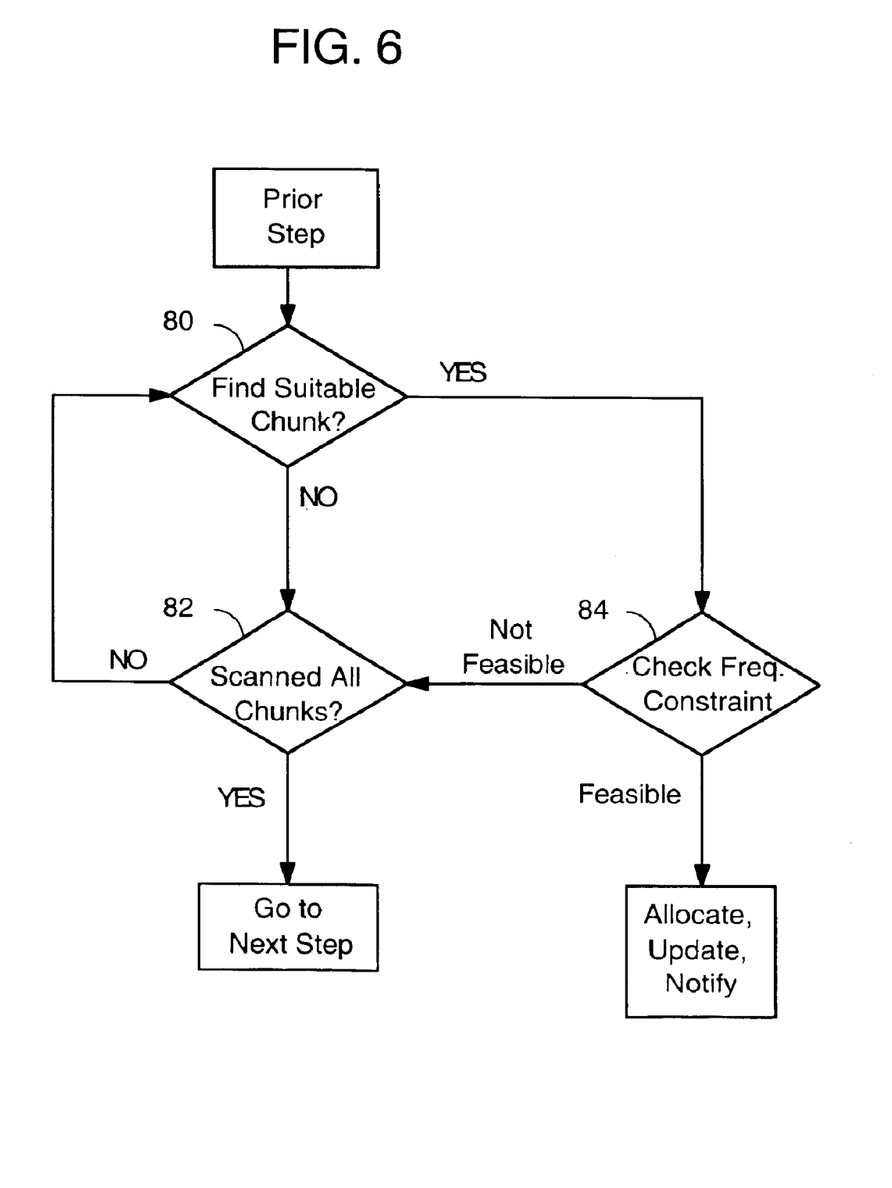
FIG. 6 is a flow chart illustrating the details of allocation steps 60 and 64 of FIG. 5, wherein step 60 attempts to find and allocate a time slot chunk whose size exactly matches the size of a request, and step 64 attempts to find and allocate a chunk whose size is greater than the requested size.

The details of allocation steps 60, 64, 66, and 68 will now be described in relation to FIGS. 6, 7, and 8. The details of step 60, which attempts to find and allocate an exact match for the request, is shown in FIG. 6. The procedure begins at 80 by checking the CCM for a suitable chunk, i.e., a chunk whose size exactly matches the request size. If the current chunk being checked at 80 is not suitable, then decision box 82 determines whether the entire CCM has been scanned. If not, the procedure loops back to 80 to check the next chunk in the CCM. If the entire CCM has been scanned, then the procedure ends with failure to find an exact match. If decision block 80 identifies a suitable chunk during the scanning, decision block 84 checks to see if the chunk satisfies a frequency constraint. If the chunk is not feasible, then control is transferred to block 82. If the chunk is feasible, however, then the procedure ends with success.

The details of allocation step 64 (FIG. 5) are identical to those of step 60, with the exception that the procedure checks for a chunk whose size is greater than the requested size, rather than equal to the requested size. Thus, the flowchart of FIG. 6 and the accompanying description above serve to describe step 64, with the exception that the check at block 80 is appropriately modified.

Figure 7:
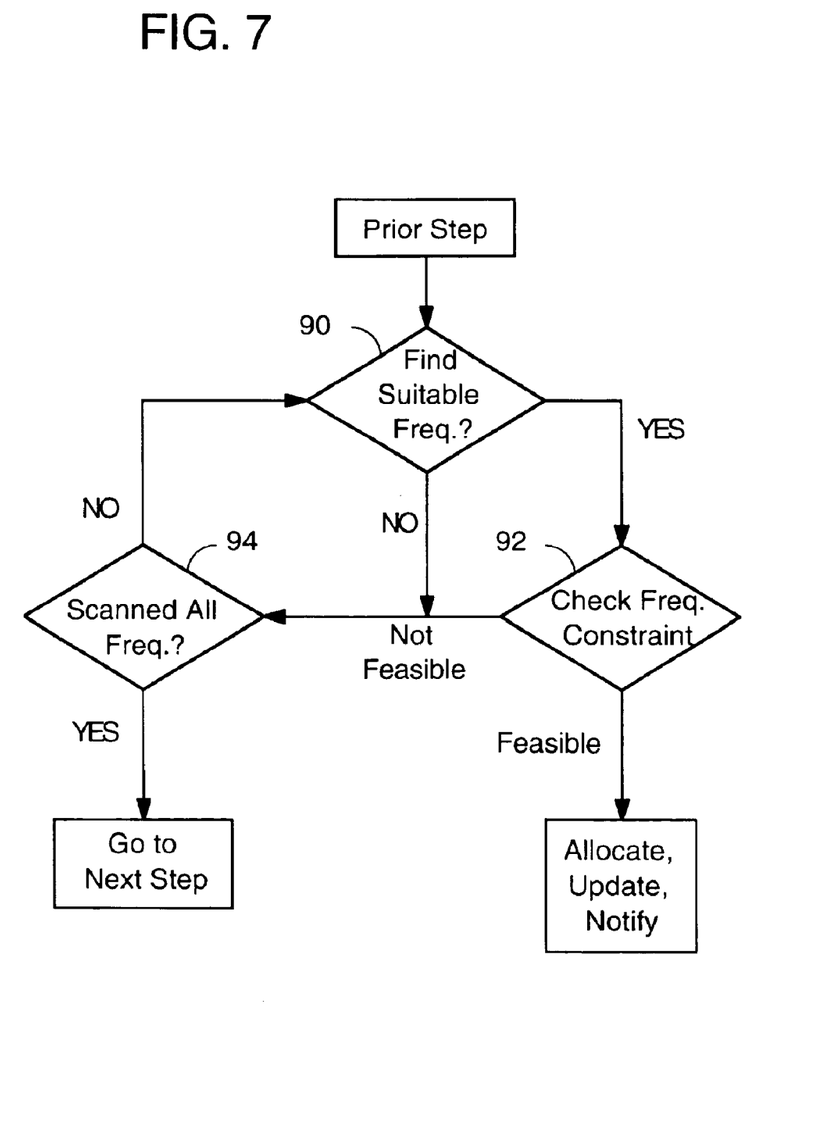
FIG. 7 is a flow chart illustrating the details of allocation step 66 of FIG. 5, wherein the port controller attempts to allocate the user request in a single frequency to avoid the blind spot problem caused by frequency switching.

The details of allocation step 66 are illustrated in FIG. 7. In this procedure, the port controller attempts to allocate the user request in a single frequency to avoid the blind spot problem caused by frequency switching. At block 90, the procedure finds the next frequency in the CCM with enough slots to satisfy the request. If such a frequency is found, then the available slots in that frequency are checked for frequency switching constraints at block 92. If the constraints are met then the slots are allocated; otherwise the port controller checks at block 94 whether all frequencies in the CCM have been scanned. If not, then the port controller returns to block 90 and scans for the next frequency with enough available slots. The procedure ends by either finding a feasible frequency or unsuccessfully scanning all available frequencies.

Figure 8:
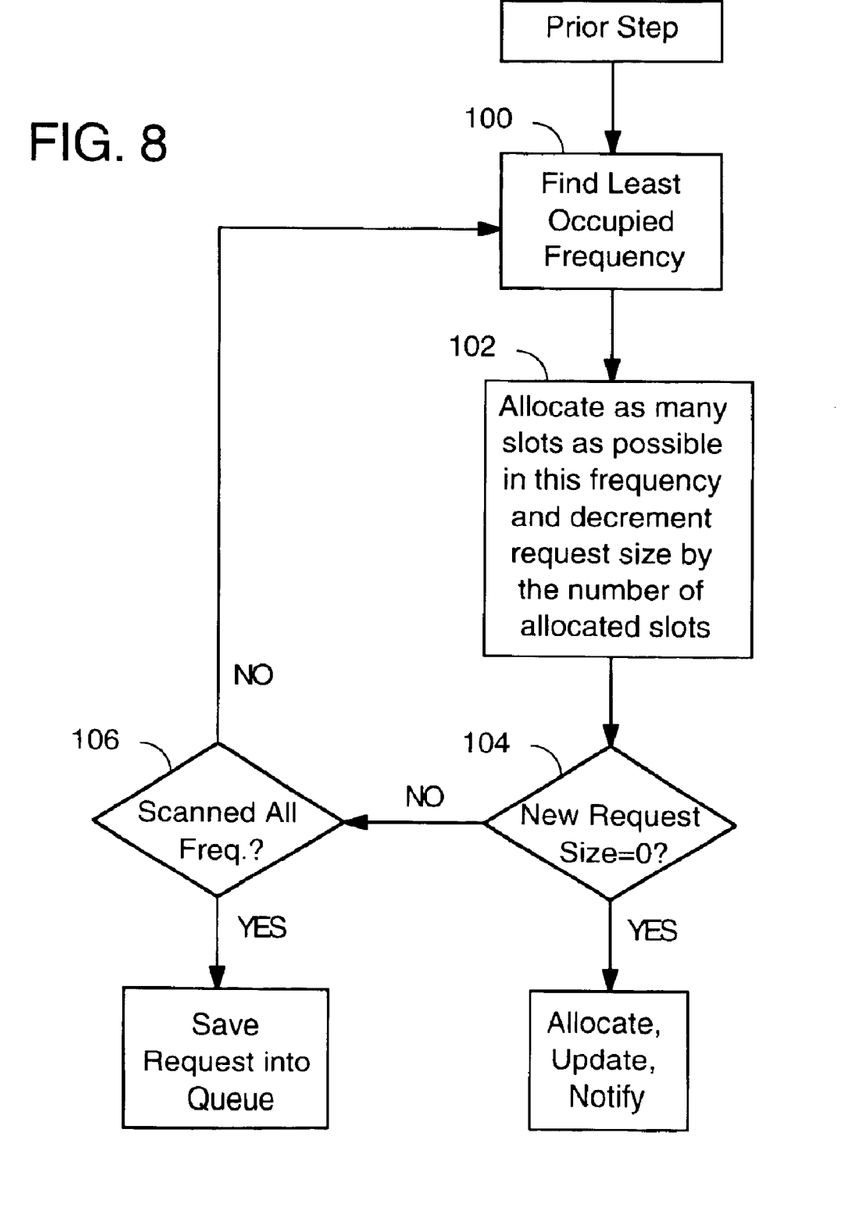
FIG. 8 is a flow chart illustrating the details of allocation step 68 of FIG. 5, wherein the port controller attempts to perform a multiple frequency assignment.

FIG. 8 illustrates the details of allocation step 68, in which the port controller attempts to perform a multiple frequency assignment. First, at block 100, the port controller determines the frequency with the highest number of available slots, i.e., the least occupied frequency. Then, at block 102, all feasible slots in that frequency are allocated, and the remaining size of the request is determined by subtracting the number of slots already allocated from the request size. Blocks 104 and 106 implement a loop that repeats this multiple frequency allocation until the remaining request size is zero (the request is completely allocated) or all frequencies in the CCM are completely scanned. The allocation step is unsuccessful when all frequencies in the CCM are completely scanned but the request cannot be allocated.

The DRAMA algorithm described above uses a heuristic and greedy resource allocation strategy. Those skilled in the art will appreciate that the implementation details of this technique may be altered in various ways without departing from the essential ideas of the invention. In addition, the technique itself may be altered to accommodate various specific situations. For example, in some cases it may be desirable to develop a resource allocation policy that considers the existing request, the requests that are waiting to be allocated and the frequency switching constraints, and re-arranges the channel matrix to allocate the highest possible number of requests. The speed and the success of the resource allocation algorithm may then be compared to the heuristic resource allocation utilized in DRAMA.

Media access and resource allocation delays in DRAMA may be reduced either by increasing the bit rate of the signaling channels or by decreasing the signaling frame length in environments that are lightly loaded.

It will also be noted that co-channel interference may be mitigated by dynamic channel allocation or by interference cancellation techniques. Techniques for combining resource allocation with dynamic channel allocation in order to mitigate co-channel interference in frequency-reuse based systems can be used in the context of the present invention.

The capacity of the wireless network can be increased by increasing the bandwidth allocated to each frequency of a radio port, thereby increasing the bit rate and the number of slots per frequency, or by increasing the number of frequencies allocated to each radio port. In most cases, increasing the bit rates of existing frequencies results in better throughput than increasing the number of frequencies because of the frequency-switching problem.

Advantages and Comparison with Prior Art

The advantages and effectiveness of the DRAMA techniques are enjoyed in all the various environments: wide area, campus, and local. The wide area network represents a low data rate environment similar to current cellular phone environments, but having an added packet data capability. Typically, the traffic mix is roughly 75 percent CBR and 25 percent data traffic. The campus wide network is a relatively high bit rate environment that supports all three kinds of CBR traffic and high bit rate data traffic. The traffic mix is typically 50 percent data and 50 percent CBR traffic. In a local area network environment there may be other network alternatives for CBR traffic; therefore, the local area environment is typically dominated primarily by data traffic. The traffic mix in the local area network is typically 25 percent CBR and 75 percent data traffic. In all these environments, the advantages of DRAMA are enjoyed.

The advantages of the DRAMA technique are further appreciated through a comparison with the prior art MAC techniques. Although the prior art has presented other media access control and resource allocation algorithms for wireless ATM networks, they do not provide all the advantages of DRAMA. The leading alternatives to DRAMA are the multiple-services dynamic reservation (MDR) protocol developed by NEC, the distributed queuing request update multiple access (DQRUMA) technique developed by Lucent, and polling multiple access (PMA) from Carleton University of Ontario, Canada. All of these algorithms use either reservation polling or polling for access to shared radio resources, unlike Ethernet where terminals listen for collisions before they transmit. Although reservation or polling based media access schemes introduce added network access delays, they avoid the "hidden terminal" problem and the large access delays of collision detection based schemes.

The MDR technique developed at NEC uses a 2 Mbits/sec single frequency wireless radio link that is divided into request mini-slots and user data slots. MDR supports multiple traffic types and can offer quality of service guarantees. In the media access control of MDR, the users access the request mini-slots and transmit a request in the uplink direction. Once the resources are allocated, the users transmit their data. The resource allocation is based on a dynamic TDMA (time division multiple access)/TDD (time division duplexing) method for provisioning of ATM transport services. This technique does not fragment data requests in time and suffers from low data throughput. DRAMA provides performance superior to the MDR protocol, and also has the added benefits of supporting multiple frequencies operating in multiple tiers, seamless transitions between multiple tiers in the wireless ATM network, and shared control and signaling formats for unifying the signaling across all tiers of the network.

PMA is a combination physical layer and link layer protocol. PMA uses sectored antennas and polling to provide media access control, resource allocation and to mitigate co-channel interference caused by frequency reuse in wireless ATM local area networks. The transport bit rate proposed in PMA is 160 Mbits/sec. with all the radio ports in the local area network sharing the same frequency band. In this case the system capacity is limited by the signal-to-interference ratio (SIR). DRAMA is superior to PMA in that DRAMA is a multi-tier protocol that supports both LAN and other environments and does not depend on the physical layer that is being used for medium access control. In addition, DRAMA performs better than PMA in the LAN environment for both CBR and data traffic types.

Lucent's DQRUMA technique, like PMA, is designed for LANs. It provides time-of-expiry based priority queuing for supporting multiple traffic types and uses existing information packets to "piggy-back" transmission requests for the next available time slots. DQRUMA uses a round robin packet transmission policy for resource allocation. DRAMA offers the following advantages over DQRUMA. DRAMA offers full support for multi-tier operation by supporting multiple frequencies and frequency-time sliced resource allocation. DRAMA may be used even in low bit rate environments without degradation of access delays, while DQRUMA's 10-time slot average delay degrades with reduced bit rate. In DQRUMA, even when piggy backing is used, the resources still need to be allocated at every allocation step. DRAMA reserves resources for CBR traffic and eliminates contention for on-going CBR requests. This results in guaranteed bandwidth for CBR requests.

In conclusion, it will be evident that the DRAMA technique provides for the first time a media access control and resource allocation technique for multi-tier wireless ATM networks that involve the use of multiple frequency bands. DRAMA thus provides a technique to take full advantage of all the available bandwidth and provide seamless ATM wireless service between distinct environments. None of the prior art techniques provides a MAC technique for a multi-tier environment, and none solves or even attempts to solve the frequency-switching problem in multi-tier wireless ATM networks. Even in single tier portions of the network, DRAMA still outperforms the known techniques in various respects. It will also be noted that DRAMA scales well between different environments.

What is claimed is:

1. A method for frequency-time sliced resource allocation in a multi-tier wireless ATM network, the method comprising:

a) receiving at a reservation-based port controller on a wireless signaling channel one or more requests for access to a shared frequency-time sliced wireless medium;

b) combining received requests with queued requests;

c) prioritizing combined requests with respect to priority class and order of arrival; and d) determining, on a request-by-request basis, whether a requested size is larger than the total number of available frequency-time slots and accordingly queues a request or searches a channel chunk matrix (CCM) for a match.

2. The method of claim 1, further comprising:

generating said CCM from a channel matrix for indexing and referencing resources available in said multi-tier wireless ATM network; wherein said channel matrix represents a collection of frequency-time slots.

3. The method of claim 2, further comprising:

grouping empty time slots in each frequency, which is represented by a column of said channel matrix, into contiguous chunks;

sorting said contiguous chunks in order of magnitude; and recording respective slot position and size of said contiguous chunks in a corresponding column of said CCM.

4. The method of claim 1, wherein said match is a feasible frequency-time slot or chunk of slots whose assignment to said requested size does not result in a violation of frequency switching constraints.

5. The method of claim 1, wherein said match is a feasible frequency-time slot or chunk of slots whose size equals to said requested size.

6. The method of claim 1, wherein the total number of available frequency-time slots is greater than the requested size, step d) further comprising:

searching said CCM for a single frequency that has multiple feasible chunks whose cumulative size is equal to or greater than the requested size.

7. The method of claim 1, wherein the total number of available frequency-time slots is greater than the requested size, step d) further comprising:

searching said CCM for multiple feasible chunks from multiple frequencies.

8. The method of claim 1, wherein each entry in said corresponding column of said CCM contains a pair of integers representing the number of idle time slots in a chunk and the temporal position thereof.

9. The method of claim 1, wherein
said match is found by a greedy resource allocation strategy comprising the following successive allocation steps:
a) searching for a single contiguous set of available time slots in a single frequency, where the size of the set of available slots is equal to the requested size;
b) searching for a single contiguous set of available time slots in a single frequency, where the size of the set of available slots is greater than the requested size;
c) searching for separate chunks of available time slots in a single frequency; and
d) searching for separate chunks of available time slots in multiple frequencies.

10. The method of claim 9, wherein
each allocation step comprises checking whether the allocation violates a frequency switching constraint.

11. The method of claim 1, further comprising:
saving unsatisfied requests in a request queue, each unsatisfied request having a requested size larger than the total number of available frequency-time slots.

12. The method of claim 1, further comprising: transmitting a notification of allocation to a user.

13. The method of claim 1, wherein
the queued requests have higher priority than the received requests in the same priority class.

14. A radio port controller configured to perform the method steps of claim 1.

15. A digital computer system configured to perform the method steps of claim 1.

16. A computer readable medium tangibly embodying a computer-executable program of instructions implementing the method steps of claim 1.

* * * * *